No. 692,777. Patented Feb. 4, 1902.
G. L. BLAIR.
VEHICLE BRAKE.
(Application filed June 20, 1901.)
(No Model.) 2 Sheets—Sheet 2.
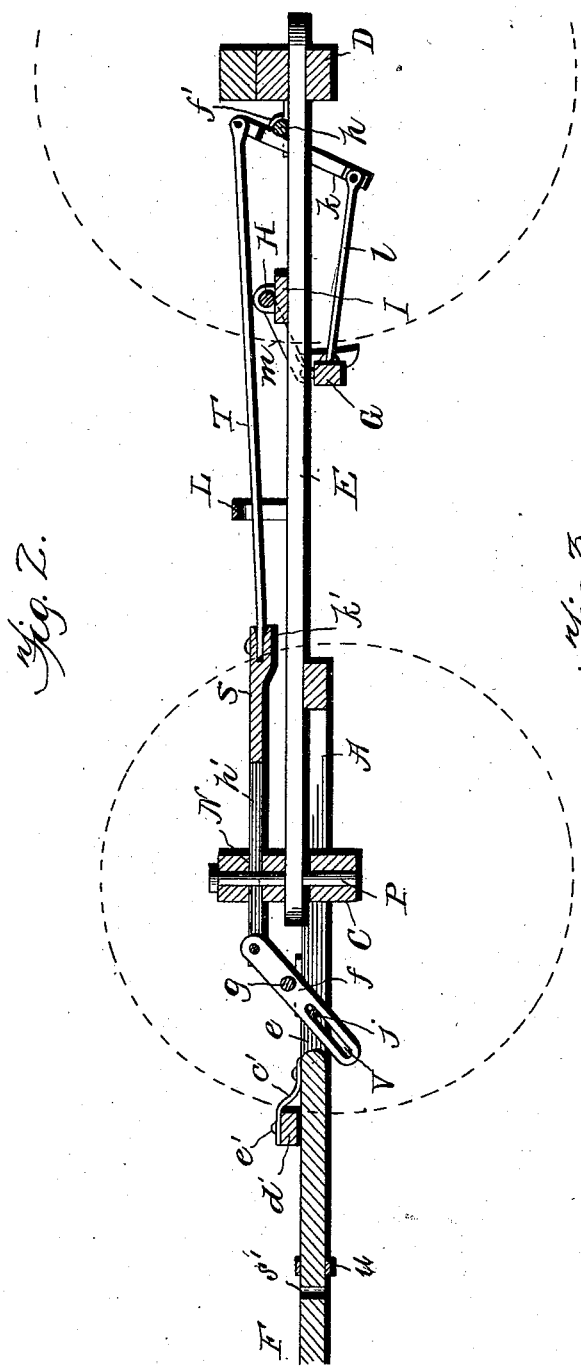
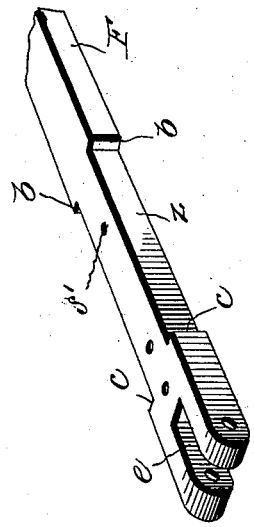
Witnesses
G. L. Blair,
Inventor
by
Attorney

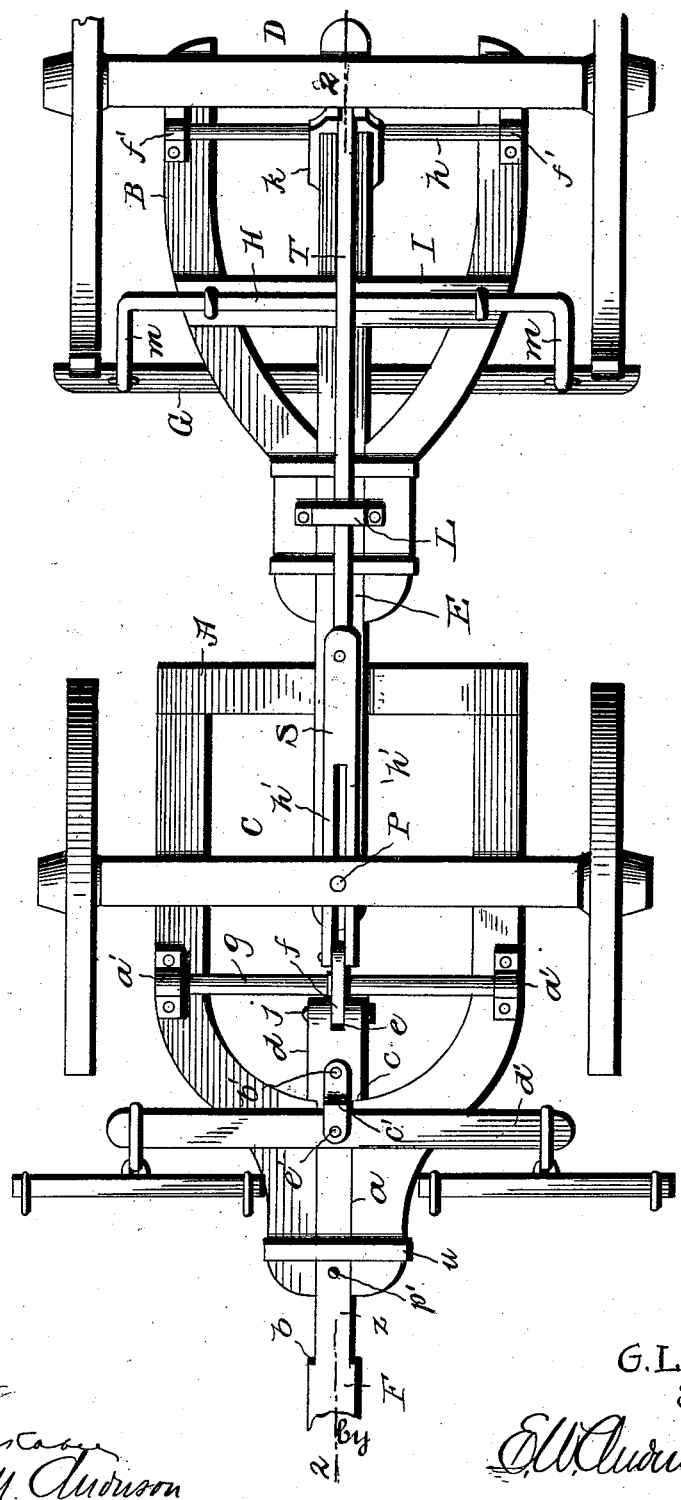

UNITED STATES PATENT OFFICE.

GARDNER L. BLAIR, OF REDWINE, KENTUCKY, ASSIGNOR OF ONE-HALF TO DANIEL B. HALL, OF REDWINE, KENTUCKY.

VEHICLE-BRAKE.

SPECIFICATION forming part of Letters Patent No. 692,777, dated February 4, 1902.

Application filed June 20, 1901. Serial No. 65,375. (No model.)

*To all whom it may concern:*

Be it known that I, GARDNER L. BLAIR, a citizen of the United States, and a resident of Redwine, in the county of Morgan and State of Kentucky, have made a certain new and useful Invention in Vehicle-Brakes; and I declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a plan view of my invention as applied, the wagon-body being removed. Fig. 2 is a section on the line 2 2, Fig. 1. Fig. 3 is a detail view of a portion of the draft pole or tongue F.

The invention relates to automatic wagon-brakes; and it consists in the novel construction and combinations of parts, as hereinafter set forth.

In the accompanying drawings, illustrating the invention, the letter A designates the front hounds, and B the rear hounds; C, the front axle, and D the rear axle. The reach is indicated at E and the sliding pole or tongue at F.

In the front hounds are provided bearings $a$, extending longitudinally and adapted to receive between them the limited slide portion $z$ of the rear end of the draft tongue or pole F, which has a sliding motion backward and forward, said slide portion of the pole being longer than the bearings $a$. The backward motion is limited by the front stop-shoulders $b$ on the sides of the pole and the forward motion by the rear stop-shoulders $c$ on said pole, said stops being adapted to engage corresponding abutments of the bearings $a$. The rear stops are usually the shoulders of the expanded rear end $d$ of the pole, which is slotted or bifurcated at $e$ to receive the slotted lower end of the short lever $f$, which is pivoted to the branches of said slot or bifurcation by a horizontal pin $j$.

The lever $f$ is secured to or forms a part of a transverse bracing rock-shaft $g$, which is pivoted in bearings $a'$ on the side bars of the front hounds just in front of the bolster. In the bifurcated rear extension $d$ of the pole is made a seat for the pin $b'$, whereby the strap $c'$ of the doubletree $d'$ is connected to said extension, the forward end of said strap being connected to the doubletree by the pin $e'$.

The lateral branches of the rear hounds are provided with bearings $f'$ just in front of the rear bolster for the rock-shaft $h$, to which is secured the short two-branched or double-arm lever $k$, embracing the reach. Between the lower ends of the parallel arms of this lever is pivoted the rear end of a connecting thrust-rod $l$, which extends forward and is attached to the transverse brake-bar G, which swings from the lateral hanger-arms $m$ of the bail-form hanger H, the transverse portion of which is pivoted on the transverse bar I, which connects the lateral branches of the rear hounds about midway between the rear bolster and the front end of said rear hounds. The hanger-arms $m$ extend downward and forward obliquely parallel or nearly parallel to the rear lever $k$ and the front lever $f$. The rear end of the reach passes between the arms or branches of the rear lever $k$. Above the front end portion of the rear hounds is a transverse bracing strap or guard L, and through the middle portion of the front bolster is made a slot or transverse opening N. The king-pin P extends vertically through the middle of this slot and between the lateral branches $h'$ of a slotted or bifurcated coupling-bar S, which extends from front to rear through said opening N on the front bolster. The rear end of the coupling S, which is located near the rear end of the front hounds, is also bifurcated, but is cleft horizontally or at right angles to the vertical opening between its front branches $h'$. Between the forward ends of the branches $h'$ of this coupling is pivoted the upper end of the front lever $f$, and in the horizontal cleft between the rear branches $k'$ of said coupling is vertically pivoted the front end of a connecting-bar T, which extends to the rear through the limiting strap or guard L to the upper end of the rear lever $k$, to which it is pivoted. In this manner a lateral sweep or movement of the connected ends of the couplings S and T is provided for.

The lower end of the front lever $f$ is slotted lengthwise, as at V, for the accommodation of the pin $j$, whereby the bifurcated end of the pole is pivoted thereto. In this manner the necessary play is given without interference with the operation of the parts.

The operation is as follows: So long as the team is going forward the pole is in forward position, and the draft, acting through the levers $f$ and $k$, their longitudinal couplings S and T, and the connecting thrust-rod $l$, holds the brake-bar and its shoes away from the wheels; but when the team is going downhill or is slowed up for any reason the wagon in moving forward causes the front hounds to slide forward on the rear portion of the pole in such wise that the pendent brake is promptly applied through the forward movement of the upper ends of the levers $f$ and $k$ and the couplings S and T and the consequent rearward pull of the lower end of the lever $k$ on the brake-bar connection $l$.

The pole is provided with a socket or bearing at $s'$ for a stop-pin $p'$, which is for temporary use when it is desired to hold the pole in forward or running position—as, for instance, when it is necessary to back the team. This socket $s'$ is made in the pole just forward of the front strap $u$ of the front hounds when the pole is in forward position. It is therefore in rear of the front stops $b$ of said pole.

The brake-gear described is strong and durable and extends along the hounds and reach in such a manner that it is not liable to interfere with the movements of the running-gear or to be accidentally disarranged. The coupling is so devised that the brake-gear will operate on a curve or when the pole and reach are in angular position with relation to each other—a feature to which the pivot-slot connection between the coupling S and the front lever $f$ is of practical importance.

Having described this invention, what I claim, and desire to secure by Letters Patent, is—

An automatically-acting vehicle-brake, consisting of the horizontal bracing rock-shaft having bearings in and connecting the branches of the front hounds forward of the front axle, and carrying a lever, the horizontal bracing rock-shaft, having bearings in and connecting the branches of the rear hounds, and carrying a lever slotted to embrace the reach, the connecting-rod for the upper arms of said levers having a pivotal joint between the front and rear hounds, the forward section of such rod having a slot therein, the king-bolt engaging such slot, and also connecting the reach with the front bolster, the slidable draft-tongue embraced by the branches of the front hounds, and having the stop-shoulders for engagement therewith, and connected to the lower arm of the lever of the forward rock-shaft, the pendent brake-beam having a connection with the lower arm of the lever of the rear rock-shaft, and the bracing-strap connecting the branches of the rear hounds, and limiting lateral movement of the rear section of said connecting-rod, substantially as specified.

In testimony whereof I affix my signature in presence of two witnesses.

GARDNER L. BLAIR.

Witnesses:
D. P. LEWIS,
WILLIAM W. HALL.